United States Patent [19]

Kawamata et al.

[11] Patent Number: 5,508,117
[45] Date of Patent: Apr. 16, 1996

[54] MAGNETIC RECORDING MEDIUM AND PRODUCTION PROCESS THEREOF

[75] Inventors: Toshio Kawamata; Yasushi Endo, both of Kanagawa, Japan

[73] Assignee: Fuji Photo Film Co., Ltd., Kanagawa, Japan

[21] Appl. No.: 150,267

[22] Filed: Nov. 10, 1993

Related U.S. Application Data

[63] Continuation of Ser. No. 814,821, Dec. 31, 1991, abandoned.

[30] Foreign Application Priority Data

Jan. 10, 1991 [JP] Japan ..................... 3-012468

[51] Int. Cl.$^6$ ............... B22D 25/00; G11B 5/66; B32B 5/16
[52] U.S. Cl. ............... 428/610; 428/212; 428/213; 428/323; 428/328; 428/329; 428/694 B; 428/694 BG; 428/694 BU; 428/694 BN; 428/694 BA; 428/694 BH; 428/694 BC; 428/900
[58] Field of Search ............... 428/323, 328, 428/329, 610, 694 B, 694 BG, 694 BU, 694 BN, 694 BA, 694 BH, 900, 212, 213; 427/131

[56] References Cited

U.S. PATENT DOCUMENTS

| | | | |
|---|---|---|---|
| 4,015,042 | 3/1977 | Chassaigne | 428/325 |
| 4,687,704 | 8/1987 | Miyoshi et al. | 428/328 |
| 4,716,077 | 12/1987 | Okita et al. | 428/328 |
| 5,093,172 | 3/1992 | Kato et al. | 428/64 |
| 5,122,414 | 6/1992 | Shimizu | 428/323 |
| 5,342,668 | 8/1994 | Echigo | 428/64 |
| 5,389,418 | 2/1995 | Ota | 428/64 |

Primary Examiner—L. Kiliman
Attorney, Agent, or Firm—Sughrue, Mion, Zinn, Macpeak & Seas

[57] ABSTRACT

Disclosed is a magnetic recording medium comprising a nonmagnetic support having thereon a magnetic layer comprising a ferromagnetic powder and a binder resin as the main components together with abrasive particles. The ferromagnetic powder is a hexagonal ferrite fine powder having particle sizes of from 0.01 to 0.2 μm and a coercive force of from 600 to 2,000 Oe. The binder resin is composed of a polyurethane resin and/or a vinyl chloride resin each having at least one kind of a polar group, the abrasive particles are composed of a fine particle abrasive having a mean particle size of from 0.1 to 0.39 μm and a coarse particle abrasive having a mean particle size of from 0.4 to 1.0 μm, and the density of the coarse particle abrasive distributed in the vicinity of the surface of the magnetic layer is higher than that of the coarse particle abrasive distributed in the other region of the magnetic layer.

4 Claims, 1 Drawing Sheet

▫ : FINE PARTICLE ABRASIVE

○ : COARSE PARTICLE ABRASIVE

MAGNETIC RECORDING MEDIUM AND PRODUCTION PROCESS THEREOF

This is a continuation of application Ser. No. 07/814,821 filed Dec. 31, 1991, now abandoned.

FIELD OF THE INVENTION

The present invention relates to a magnetic recording medium and a production process thereof, and more particularly to a magnetic recording medium using a hexagonal ferrite fine powder and a production process thereof.

BACKGROUND OF THE INVENTION

Hitherto, a magnetic recording medium composed of a nonagnetic support having formed thereon a magnetic layer comprising a ferromagnetic powder composed of the acicular crystals of $\gamma\text{-}Fe_2O_3$, $CrO_2$, Co-doped $Fe_2O_3$, etc., dispersed in a binder has been widely used for magnetic recording and reproduction.

However, recently, there has been a strong demand to improve recording density to attain a large capacity for recording and to miniaturize a magnetic recording device. But in order to obtain a magnetic recording medium suitable for high-density recording using a conventional acicular ferromagnetic powder, it is necessary to sufficiently reduce the maximum size of the acicular ferromagnetic powder than the recording wavelength or the recording bit length. At present, an acicular ferromagnetic powder having a size of about 0.3 μm has been practically used and a recording wavelength of as low as about 1 μm has been obtained.

To obtain a magnetic recording medium capable of far higher density recording, it is necessary to further reduce the size of the acicular ferromagnetic powder. However, with such small acicular ferromagnetic powder, since the diameter thereof is as thin as below 100 Å and the volume of the particle is as small as below $10^{-17}$ $cm^3$, there is the problem that the magnetic characteristics are lowered by the effects of a thermal disturbance on the surface. Also, when a magnetic field is applied to the coated magnetic layer, a sufficient orientation of the ferromagnetic powder is not obtained.

Recently, to solve these problems, a magnetic recording medium using a hexagonal ferrite ferromagnetic substance having a tabular form and an axis of easy magnetization in the direction perpendicular to the plane was developed as described, e.g., in JP-A-58-6525 and JP-A-58-6526 (the term "JP-A" as used herein means an "unexamined published Japanese patent application"). By this development, it is possible to reduce the mean particle size (diameter) of the ferromagnetic powder below 0.05 μm and high density recording becomes possible.

Also, for improving the abrasion resistance of the magnetic layer of a magnetic recording medium and a magnetic head, the present inventor previously proposed that abrasives composed of $Al_2O_3$ having particle sizes of from 0.003 to 0.1 μm and a nonmagnetic powder having a Mohs' hardness of at least 5 and particle sizes of from 0.3 to 2.0 μm be added to the magnetic layer of a magnetic recording medium as disclosed in JP-A-58-56227. The present inventor also proposed that in a magnetic recording medium having a back layer on the opposite side of the support to the side carrying a magnetic layer, inorganic powders composed of a mixture of fine inorganic particles having a mean particle size of from 0.01 to 0.1 μm and coarse inorganic particles having a mean particle size of from 0.1 to 0.8 μm be added to the back layer, whereby the S/N ratio, the friction coefficient, and the running durability of the magnetic recording medium could be improved as described in JP-A-57-53825.

Since hexagonal ferrite fine powder has a low saturation magnetization compared to that of Co-doped $Fe_2O_3$ ferromagnetic powder, a metal (or alloy) ferromagnetic powder, etc., and hence a high output is difficult to obtain when using a hexagonal ferrite fine powder, the packing density of the hexagonal ferrite fine powder must be increased to provide a magnetic recording medium giving a high output. However, since the hexagonal ferrite fine powder has a fine particle size and the form thereof is hexagonal, the dispersibility thereof in a binder is inferior to conventional ferromagnetic powders. Hence it is fundamentally difficult to insure the running durability of the magnetic recording medium by keeping a low friction coefficient. Thus, in order to insure the running durability of a magnetic recording medium using a hexagonal ferrite fine powder, abrasives composed of fine inorganic particles and coarse inorganic particles have to be used. Also the amount of the abrasives and hence the amount of the binder resin must be increased, thereby causing the problem that the packing density of the hexagonal ferrite fine powder must be sacrificed. It is therefore difficult to simultaneously achieve reproducing output and running durability.

Also, even when one intends to improve reproducing output by increasing the saturation magnetization amount, in the case of using a hexagonal ferrite fine powder having a large surface area, the dispersibility thereof is reduced. Consequently, it is difficult to simultaneously improve reproducing output and running durability of the magnetic recording medium.

SUMMARY OF THE INVENTION

An object of the present invention is to provide a magnetic recording medium using hexagonal ferrite fine powder in which the reproducing output is improved, and at the same time running durability is also improved by reducing the coefficient of friction.

Another object of the present invention is to provide a process of producing the foregoing magnetic recording medium.

It has now been discovered that the above-described objects can be achieved by the present invention as described hereinafter.

According to one embodiment of the present invention, there is provided a magnetic recording medium comprising a nonmagnetic support having thereon a magnetic layer comprising ferromagnetic powder and a binder resin as the main components together with abrasive particles, wherein the ferromagnetic powder is a hexagonal ferrite fine powder having particle sizes of from 0.01 to 0.2 μm and a coercive force of from 600 to 2,000 Oe, the binder resin is composed of at least one of a polyurethane resin and a vinyl chloride resin each having at least one kind of a polar group and the content of the binder resin is from 10 to 25 parts by weight per 100 parts by weight of the ferromagnetic powder, the abrasive particles are composed of a fine particle abrasive having a mean particle size of from 0.1 to 0.39 μm and a coarse particle abrasive having a mean particle size of from 0.4 to 1.0 μm, and the density of the coarse particle abrasive distributed in the vicinity of the surface of the magnetic layer is higher than that of the coarse particle abrasive distributed in the other region of the magnetic layer.

According to another embodiment of the present invention, there is provided a process of producing the above-described magnetic recording medium, which comprises, mixing and dispersing a composition mainly composed of the fine particle abrasive, the hexagonal ferrite fine powder and the binder resin uniformly, then incorporating the coarse particle abrasive thereto, subjecting the mixture to a dispersion treatment to prepare a magnetic coating composition, and coating the magnetic coating composition on a nonmagnetic support.

BRIEF DESCRIPTION OF THE DRAWING

In the accompanying drawing.

DETAILED DESCRIPTION OF THE INVENTION

Figure 1:
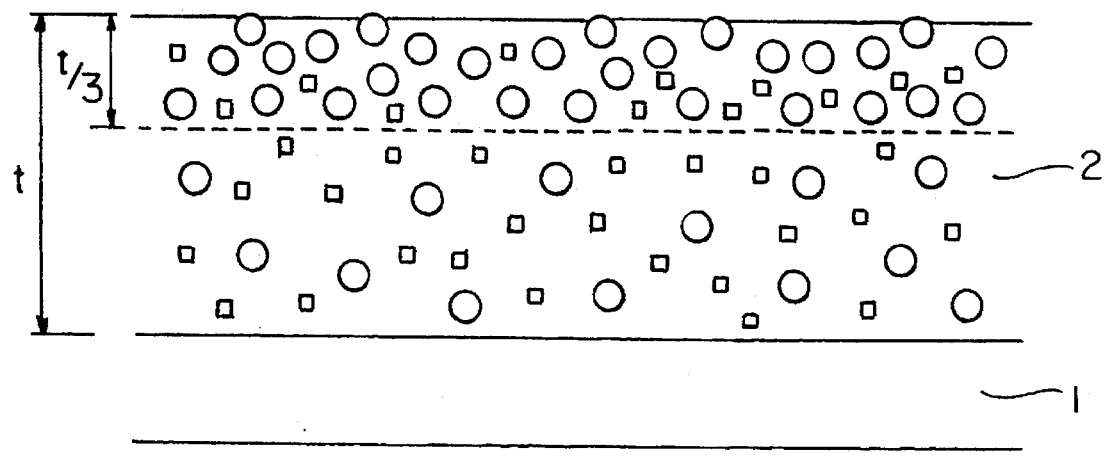
FIG. 1 is a cross-sectional view of a magnetic recording medium showing an embodiment of the invention in which 1 is a nonmagnetic support and 2 is a magnetic layer.

In the present invention, by dispersing a hexagonal ferrite fine powder which has a relatively low saturation magnetization amount as compared to conventional ferromagnetic powders and which is very difficult to disperse using a binder resin having a polar group, the dispersion level of the hexagonal ferrite fine powder can be improved and, thereby, the improvement of the output of the magnetic recording medium can be attained. Further by using abrasives composed of a combination of fine particle abrasive and coarse particle abrasive such that the foregoing specific distribution of the coarse particle abrasive is formed in the magnetic layer, the required amount of the binder resin is reduced, whereby the output of the magnetic recording medium can be improved and at the same time the running durability thereof can be insured by reducing the coefficient of friction.

In other words, in this invention, the fine particle abrasive and the coarse particle abrasive are used together. But it has been discovered that by distributing the coarse particle abrasive mostly near the surface of the magnetic layer, while further increasing the packing density of the abrasives in the vicinity of the surface of the magnetic layer to increase the output of the recording medium, running durability is greatly improved with a small amount of the abrasives.

In this invention, the coarse particle abrasive efficiently exists in the vicinity of the surface of the magnetic layer of the magnetic recording medium and has the function of protecting the surface of the magnetic layer from sliding on the magnetic head.

By distributing the high density coarse particle abrasive in the vicinity of the surface of the magnetic layer, the friction coefficient of the magnetic layer with the magnetic head is lowered and as the result thereof, the running durability of the magnetic recording medium can be improved.

The term "in the vicinity of the surface of the magnetic layer" as used herein means the region from the upper surface to t/3 of the magnetic layer from the surface side wherein t represents a thickness of the magnetic layer, as shown FIG. 1. The density of the abrasives can be measured by counting the number of the abrasive particles observed in an electron micrograph of the section of the magnetic layer.

Further, since the particle size of the coarse particle abrasive is largely different from that of the fine particle abrasive, these abrasives can be distinguished on the electron micrograph.

Preferably, the density of the coarse particle abrasive distributed in the region from the upper surface to t/3 of the magnetic layer is at least twice that of the coarse particle abrasive distributed in the other region of the magnetic layer.

In this invention, the amount of the binder resin is from 10 to 25 parts by weight, and preferably from 15 to 22 parts by weight, per 100 parts by weight of the ferromagnetic powder.

In the magnetic recording medium of the present invention, digital signals of at least 17.5 KBpi (Bpi is a bit number per 1 inch) can be recorded. The form of the magnetic recording medium of this invention may be optional bit is particularly preferably a disk form.

In the magnetic recording medium of this invention, there is no particular restriction on the means for distributing the high density coarse particle abrasive in the vicinity of the surface of the magnetic layer. For example, by mixing and dispersing a composition mainly composed of a hexagonal ferrite fine powder, a binder resin and the fine particle abrasive uniformly, then incorporating the coarse particle abrasive thereto, subjecting the mixture to a dispersion treatment to prepare a magnetic coating composition, and coating the magnetic coating composition on a nonmagnetic support, the high density coarse particle abrasive can be distributed in the vicinity of the surface of the magnetic layer.

That is, in the preparation of the magnetic coating composition, the incorporation of the coarse particle abrasive to the coating composition can be conducted after the completion of the dispersion of the hexagonal ferrite fine powder and the fine particle abrasive.

The incorporation of the coarse particle abrasive may be conducted in a dry state (powder form) or in a wet state in which it is dispersed in a solvent. The latter incorporation method can shorten the processing time since the wetting in the magnetic coating composition can be conducted rapidly.

In the dispersion of the hexagonal ferrite fine powder and the fine particle abrasive with the binder resin, the binder resin is firmly adsorbed on the particle surface of the ferrite fine powder and the fine particle abrasive. On the other hand, the coarse particle abrasive is added later thereto and dispersed. Therefore, the degree of dispersion of the coarse particle abrasive is smaller than that of the hexagonal ferrite and the fine particle abrasive, and the coarse particle abrasive tends to behave independently in the system of dispersion as compared to the other components. As a result, it is considered that the coarse particle abrasive is moved in the magnetic layer by the evaporation of solvent in the coating layer between the time of coating the coating composition on the nonmagnetic support and the time of drying, or convection, etc., to distribute in the vicinity of the surface of the magnetic layer in a relatively high density.

According to the observation by an electron microscope of the section of the magnetic layer, it is confirmed that the fine particle abrasive is uniformly distributed and on the other hand, the coarse particle abrasive is distributed in the vicinity of the surface of the magnetic layer in a relatively high density as shown in FIG. 1. In the magnetic recording medium of the present invention, a part of the coarse particle abrasive is generally present on the surface of the magnetic layer as protrusion as shown in FIG. 1. It is assumed that the presence of the coarse particle abrasive on the surface of the magnetic layer is effective for increasing the abrasive action of the magnetic recording medium of the present invention.

Accordingly, the coating method and the coating condition in the process of this invention can be variously selected. For example, options for the coating method include an air doctor coating method, a blade coating method, an air knife coating method, a squeeze coating method, an impregnation coating method, a reverse roll coating method, a transfer roll coating method, a gravure coating method, a kiss coating method, a cast coating method, a spray coating method, a bar coating method, a spin coating method, etc., can be used. Also, in the case of using, e.g., a gravure roll as a coating apparatus, it is preferred that the coating speed is from 5 meters/minute to 200 meters/minute and the coating temperature is from 40° C. to 120° C.

In the process of this invention, after coating, a drying treatment, an orientation treatment, and surface smoothening treatments such as a calendering treatment, a polishing treatment, etc., can be properly applied and the order and combination of these treatments can be selected according to the purpose.

In particular, in the process of this invention, it has been found that by applying a surface smoothening treatment to the magnetic layer of the magnetic recording medium, a magnetic recording medium having the smooth surface with an excellent abrasion resistance is obtained. The surface smoothening treatment is usually carried out by a smoothening treatment before drying the coated layer or by a calendering treatment after drying the coated layer.

An example of the smoothening treatment before drying the coated layer is a blanket method of contacting and sliding the surface of the magnetic coated layer with a thin film. Also, for the calendering treatment after drying the coated layer, the line pressure is from 100 kg/cm to 400 kg/cm, and preferably from 200 kg/cm to 350 kg/cm and the temperature is from 30° C. to 120° C., and preferably from 45° C. to 100° C.

The abrasives for use in this invention include materials generally used in the field of the art, such as fused alumina ($Al_2O_3$), silicon carbide (SIC), chromium oxide ($Cr_2O_3$), corundum ($Al_2O_3$), artificial corundum, diamond (C), artificial diamond, garnet ($A_3B_2(SiO_4)_3$; A: Ca, Mg, $Fe^{II}$, $Mn^{II}$; B: Al, $Fe^{III}$, Cr, $Ti^{III}$), emery (main components: corundum and magnetite), etc. The Mohs' hardness of these abrasives is preferably at least 5, and most preferably at least 7.

As the abrasives, in particular, as the coarse particle abrasive, alumina is preferable. It has been known, as will be described hereinbelow, that alumina is stable to the fluctuation of the friction coefficient between a magnetic head and a magnetic layer (one kind of stick slip). In this case, the stick slip is a phenomenon of the running speed of a magnetic recording medium fluctuating instantaneously and periodically.

The mean particle size of the fine particle abrasive is from 0.1 to 0.39 μm, and preferably from 0.15 to 0.3 μm as a value measured by an electron microscope. Typical examples of the fine particle abrasive include "AKP 50" and "HIT 55" (both are trade names of $Al_2O_3$, made by Sumitomo Chemical Company, Limited), "ERC-DBM", "HP-DBM", and "HPS-DBM" (trade names of $Al_2O_3$, made by Rayholds K. K.), "MECANOX U4" (a trade name of $Al_2O_3$, made by C. Uyemura & Co., Ltd.), "UA 2055" and "UA 5155", (both are trade names of $Al_2O_3$, made by Showa Light Metal Co., Ltd.), "G-5", "CROMEX M1", "CROMEX S1", and "CROMEX U1" (trade names of $Cr_2O_3$, made by Nippon Chemical Industrial Co., Ltd.), and "B-3" (a trade name of $Al_2O_3$, made by Showa Mining Co., Ltd.).

The amount of the fine particle abrasive is preferably from 1 to 20% by weight, and more preferably from 2 to 15% by weight based on the total weight of the ferromagnetic powder.

The mean particle size of the coarse particle abrasive is from 0.4 to 1.0 μm, and preferably from 0.4 to 0.7 μm as a value measured by an electron microscope. Typical examples of the coarse particle abrasive include "AKP 12", "AKP 15", and "AKP 20" (trade names of $Al_2O_3$, made by Sumitomo Chemical Company, Limited), and "CROM K" and "CROMEX K×10" (both are trade names of $Cr_2O_3$, made by Sumitomo Chemical Company, Limited).

The amount of the coarse particle abrasive is preferably from 0.1 to 10% by weight, and more preferably from 0.5 to 5% by weight based on the total weight of the ferromagnetic powder.

In this invention, the sum total of the fine particle abrasive and the coarse particle abrasive is from 3 to 30% by weight and preferably 5 to 15% by weight (the amount is reduced to about 30% of the amount in a conventional case in which the fine particle abrasive and the coarse particle abrasive are simultaneously added and dispersed in the binder resin) based on the total weight of the ferromagnetic powder. The compounding ratio of the two abrasives may be optional but it is preferred that the amount of the coarse particle abrasive is in the range of from 0.1 to 0.8 part by weight to 1 part by weight of the fine particle abrasive.

The hexagonal ferrite fine powder for use in this invention is a tabular hexagonal ferromagnetic powder having an axis of easy magnetization in the direction perpendicular to the tabular plane.

Examples of the composition of the hexagonal ferrite include the substitution products or Co-substitution products of barium ferrite, strontium ferrite, lead ferrite, and calcium ferrite. Practically, there are magnetoplumbite type barium ferrite, magnetoplumbite type strontium ferrite, magnetoplumbite type barium ferrite having a partial spinel phase, and magnetoplumbite type strontium ferrite having a partial spinel phase. Particularly preferred compositions are the Co-substitution product of barium ferrite and the Co-substitution product of strontium ferrite.

Also, for controlling the coercive force, Co—Ti, Co—Ti—Zr, Co—Ti—Zn, Ni—Ti—Zn, Ir—Zn, etc., can be added to the foregoing hexagonal ferrite.

Hexagonal ferrite is usually a particle in a hexagonal tabular form, the particle size means the width of the plate of the hexagonal tabular particle and is measured using an electron microscope. In this invention, the particle size is in the range of from 0.01 to 0.2 μm, and particularly preferably from 0.03 to 0.1 μm. Also, the mean thickness (plate thickness) of the hexagonal ferrite fine particle is from about 0.001 to 0.2 μm, and particularly preferably from 0.003 to 0.05 μm. Furthermore, the aspect ratio (particle size/plate thickness) is from 1 to 10, and preferably from 3 to 7. Also, the specific surface area ($S_{BET}$) Of the hexagonal ferrite fine powder is preferably from 25 to 70 $m^2$/g.

The coercive force of the hexagonal ferrite fine powder which can be used in this invention is in the range of from 600 to 2,000 Oe, and preferably from 700 to 1,000 Oe. Also, the saturation magnetization amount of the hexagonal ferrite fine powder for use in this invention is preferably at least 50 emu/g. If the saturation magnetization amount is less than 50 emu/g, a sufficient reproducing output is not obtained and the magnetic recording medium becomes unsuitable for high-density recording.

The saturation magnetization amount and the coercive force of the hexagonal ferrite fine powder were measured using VSM-P1 (manufactured by Toei Kogyo K.K.) at an external magnetization of 10 KOe. Also, the specific surface area was measured using a Cantersove (trade name, made by Canterchrome Co. in U.S.A.). After dehydrating the hexagonal ferrite fine powder in a nitrogen gas atmosphere at 250° C. for 30 minutes, the specific surface area was measured by a BET one point method (partial pressure 0.30).

The binder resin for use in this invention is a polar group-containing resin and is a polyurethane resin and/or a vinyl chloride resin having at least one polar group.

The polar group is particularly preferably selected from —$SO_3M$, —COOM, —$PO_3M$ (wherein M represents H or an alkali metal such as Na, K, etc.) and an amino group.

The polyurethane resin is a resin in a broad sense and if the polyurethane resin has at least the foregoing polar group and a urethane bond, the resin may have another known bonding element such as an ester bond, an ether bond, etc.

Practically, the polyurethane resin can be produced from a polyol such as polyether diol, polyester diol, polycarbonate diol, polycaprolactone diol, etc.; diisocyanate; and, if necessary, a chain extending agent such as a polyhydric alcohol, an aliphatic polyamine, an alicyclic polyamine, an aromatic polyamine, etc. The polar group may be introduced into the polyurethane resin or into a monomer component of the polyurethane resin.

Also, the vinyl chloride resin is not limited to a homopolymer of vinyl chloride only but may be a copolymer of vinyl chloride and other copolymerizable monomer such as vinyl acetate if the copolymer having a polar group. In the copolymer of vinyl chloride and other copolymerizable monomer, the proportion of the vinyl chloride component is from 60 to 95 wt %.

Practical examples of the vinyl chloride resin are a vinyl chloride-vinyl acetate copolymer, a vinyl chloride-vinyl acetate-maleic acid copolymer, a vinyl chloride-acrylic acid ester copolymer, and a vinyl chloride-glycidyl (meth)acrylate copolymer.

These resins are described in JP-A-59-8127, JP-A-59-92442, JP-A-57-92423, JP-A-59-8127, and JP-A-59-40320.

Practical examples of the polar group-containing resin for use in this invention are —COOH group-containing polyurethane ("TIM-3005", trade name, made by Sanyo Chemical Industries, Ltd.), —$SO_3$Na-containing polyurethane ("UR-8300", trade name, made by Toyobo Co., Ltd.), a —COOH-containing vinyl chloride-vinyl acetate copolymer ("400×110A", trade name, made by Nippon Zeon Co., Ltd.), —$SO_3$Na-containing polyester polyurethane ("Vylon 530", trade name, made by Toyobo Co., Ltd.), and a —$SO_3$Na-containing vinyl chloride-vinyl acetate copolymer ("MR-110", trade name, made by Nippon Zeon Co., Ltd.).

The content of the polar group is in the range of preferably from $1 \times 10^{-5}$ eq/g to $1 \times 10^{-3}$ eq/g, and more preferably from $1 \times 10^{-5}$ eq/g to $1 \times 10^{-4}$ eq/g. Also, the molecular weight of the binder resin is preferably from 10,000 to 200,000.

The above-described resins may be used singly or as a combination thereof. They also may be used together with a thermoplastic resin, a thermosetting resin, or a reaction type resin each being conventionally used as a binder for magnetic recording media. In this case, however, it is necessary that the foregoing polar group-containing resin exists in an amount of at least 5% by weight, and preferably at least 10% by weight based on the total weight of the ferromagnetic powder.

In this invention, the amount of the binder resin is from 10 to 25 parts by weight, and preferably from 15 to 22 parts by weight to 100 parts by weight of the ferromagnetic powder. In this case, when the binder resin contains the polar group-containing resin and another resin together with a hardening agent, the foregoing "binder resin" includes these components.

The thermoplastic resin which can be used together with the polar group-containing resin as a binder resin in this invention has a softening point of not higher than 150° C., an average molecular weight of from 10,000 to 300,000, and a polymerization degree of from about 50 to 2,000. Examples thereof include a vinyl chloride-vinyl acetate copolymer, a vinyl chloride resin, a vinyl chloride-vinylidene chloride copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene chloride copolymer, a methacrylic acid ester-styrene copolymer, a urethane elastomer, a nylon-silicone series resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (cellulose acetate butyrate, cellulose diacetate, cellulose triacetate, cellulose propionate, nitro cellulose, ethyl cellulose, methyl cellulose, propyl cellulose, methylethyl cellulose, carboxymethyl cellulose, and acetyl cellulose), a styrenebutadiene copolymer, a polyester resin, a chlorovinyl etheracrylic acid ester copolymer, an amino resin, various kinds of synthetic rubber series thermoplastic resins, and mixtures thereof.

As the thermosetting resin or the reaction type resin which can be used as the polar group-containing resin, the molecular weight of the resin is not more than 200,000 in the state of a coating liquid but the molecular weight becomes infinite after a reaction such as a condensation reaction, an addition reaction, etc., by heating after coating and drying the coating liquid. Among these resins, those which are not soften or melted during the thermal decomposition are preferred. Practical examples of such a resin include a phenol resin, a phenoxy resin, an epoxy resin, a polyurethane curing type resin, a urea resin, a melamine resin, an alkyd resin, a silicone resin, an acrylic reaction resin, an epoxy-polyamide resin, a nitrocellulose-melamine resin, a mixture of a high molecular weight polyester resin and an isocyanate prepolymer, a mixture of a methacrylate copolymer and a diisocyanate prepolymer, a mixture of polyester polyol and polyisocyanate, a urea formaldehyde resin, a mixture of a low molecular weight glycol, a high molecular weight diol, and triphenylmethane triisocyanate, a polyamine resin, a polyimine resin, and mixtures thereof.

With the polyurethane resin and/or the vinyl chloride resin each having a polar group for use in this invention and also other resins, an optional hardener can be used.

The hardener includes polyisocyanates such as di-, tri-, and tetra-isocyanates selected from fatty acids, aromatic compounds, and alicyclic compounds each having at least two —N═C═O groups in the molecule.

Practical examples thereof include ethane diisocyanate, butane diisocyanate, hexane diisocyanate, 2,2-dimethylpentane diisocyanate, 2,2,4-trimethylpentane diisocyanate, decane diisocyanate, ω,ω'-diisocyanate-1,3-dimethylbenzole, ω,ω'-diisocyanate-1,2-dimethylcyclohexane, ω,ω'-diisocyanate-1,4-diethylbenzole, ω,ω'-diisocyanate-1,5-dimethylnaphthalene, ω,ω'-diisocyanate-n-propylphenyl, 1,3-phenylene-diisocyanate, 1-methylbenzole-2,4-diisocyanate, 1,3-dimethylbenzole-2,6-diisocyanate, naphthalene-1,4-diisocyanate, 1,1'-dinaphthyl-2,2'-diisocyanate, biphenyl-2,4'- diisocyanate, 3,3'-dimethylbiphenyl-4,4'-diisocyanate, diphenylmethane-4,4'-diisocyanate, 2,2'-dimethylphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzole-2,4,6-triisocyanate, 1,3,5-trimethylbenzole-2,4,6-triisocyanate, diphenylmethane-2,4,4'-triisocyanate, triphenylmethane-4,4',4"-triisocyanate, tolylenediisocyanate, 1,5-naphthylene diisocyanate; the dimers or trimers of these isocyanates; and the addition products of these isocyanates and dihydric or trihydric polyalcohols.

The magnetic layer of the magnetic recording medium of this invention may further contain carbon black, a dispersing agent, a lubricant, etc., as additives in addition to the above-described ferromagnetic powder, binder resin, and abrasives.

The foregoing carbon black for use in this invention include those produced by any production methods used, for example, furnace black, thermal black, acetylene black, and channel black.

The dispersing agents (pigment wetting agent) for use in this invention include fatty acids having from 12 to 18 carbon atoms shownby $R_1COOH$ (wherein $R_1$ represents an alkyl or alkenyl group having from 11 to 17 carbon atoms) such as caprylic acid, capric acid, lauric acid, myristic acid, palmitic acid, stearic acid, behenic acid, oleic acid, elaidic acid, linolic acid, linolenic acid, stearolic acid, etc.; metal soaps composed of the alkali metal (Li, Na, K, etc.) salts or the alkaline earth metal (Mg, Ca, Ba, etc.) salts of the foregoing fatty acids; the fluorine-containing ester compounds of the foregoing fatty acids; the amides of the foregoing fatty acids; polyalkylene oxide alkylphosphoric acid esters; lecithin; and trialkylpolyolefinoxy quaternary ammonium salts (the alkyl has from 1 to 5 carbon atoms and the olefin is ethylene, propylene, etc.). Furthermore, higher alcohols having at least 12 carbon atoms and also sulfuric acid esters, etc., can be also used as the dispersing agent.

The addition amount of the dispersing agent is in the range of from 0.5 to 20 parts by weight to 100 parts by weight of the binder resin.

The lubricants which can be used in this invention include silicone oils such as dialkylpolysiloxanes (the alkyl has from 1 to 5 carbon atoms), dialkoxypolysiloxanes (the alkoxy has from 1 to 4 carbon atoms), monoalkylmonoalkoxypolysiloxanes (the alkyl has from 1 to 5 carbon atoms and the alkoxy has from 1 to 4 carbon atoms), phenylpolysiloxane, fluoroalkylpolysiloxanes (the alkyl has from 1 to 5 carbon atoms), etc.; electrically conductive fine powders such as graphite, etc.; inorganic powders such as a molybdenum disulfide powder, a tungsten disulfide powder, etc.; fine powders of plastics such as polyethylene, polypropylene, a polyethylene-vinyl chloride copolymer, polytetrafluoroethylene, etc.; α-olefin polymers; unsaturated aliphatic hydrocarbons which are in liquid states at normal temperature (compounds having n-olefin double bond bonded to the terminal carbon, carbon atom number of about 20); fatty acid esters composed of monobasic fatty acids having 12 to 20 carbon atoms and monohydric alcohols having from 3 to 12 carbon atoms; fluorocarbons; etc.

The amount of the lubricant is in the range of from 0.2 to 20 parts by weight to 100 parts by weight of the binder resin.

Among these, fatty acid esters are most preferred.

Examples of alcohol which is a raw material of the fatty acid esters include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, s-butyl alcohol, etc., and polyhydric alcohols such as ethylene glycol, diethylene glycol, neopentyl glycol, glycerine, sorbitan derivatives, etc.

Examples of fatty acid which is a raw material of the fatty acid esters include aliphatic carboxylic acids such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, palmitoleic acid, etc., or the mixture thereof.

Examples of the fatty acid ester include butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-l-propyl stearate, a dipropylene glycol monobutylether product acylated with stearic acid, diethylene glycol dipalmitate, an diol compound of hexamethylenediol acylated with myristic acid, glycerol mono-oleate, and the like ester compounds.

When the magnetic recording medium is used under a high humidity condition, the hydrolysis of fatty acid ester often takes place. In order to prevent the occurrence of hydrolysis, the isomeric structure (cis or trans from) or branching position (straight or branched chain) of the fatty acids or alcohols which are the raw materials may be appropriately selected.

There is no particular restriction on the nonmagnetic support for use in this invention, and nonmagnetic supports usually used for magnetic recording media can be used. Examples of the material for forming the nonmagnetic support are films of various synthetic resins such as polyethylene terephthalate, polyethylene, polypropylene, polycarbonate, polyethylene naphthalate, polyamide, polyamidoimide, polyimide, polysulfone, polyether sulfone, etc., and metal foils such as an aluminum foil, a stainless steel foil, etc. The thickness of the nonmagnetic support is generally from 2.5 to 100 μm, and preferably from 3 to 80 μm. In particular, in the case of a disk form, the thickness is preferably from 20 to 80 μm.

The magnetic recording medium of the present invention is obtained, after kneading and dispersing the foregoing ferromagnetic powder, the binder resin, and the fine particle abrasive with, if necessary, other additives using an organic solvent, by adding the coarse particle abrasive to the dispersion to provide a magnetic coating composition, coating the magnetic coating composition on the nonmagnetic support and, after, if necessary, orienting and drying the coated layer.

The organic solvents which are used for dispersing and kneading the foregoing components and coating the coating composition obtained include ketones such as acetone, methyl ethyl ketone, methyl isobutyl ketone, cyclohexanone, isophorone, tetrahydrofuran, etc.; alcohols such as methanol, ethanol, propanol, butanol, isobutyl alcohol, isopropyl alcohol, methylcyclohexanol, etc.; esters such as methyl acetate, ethyl acetate, butyl acetate, isobutyl acetate, isopropyl acetate, ethyl lactate, acetic acid glycol monoethyl ether, etc.; ethers such as ether, glycol dimethyl ether, glycol monoethyl ether, dioxane, etc.; tars (aromatic hydrocarbons) such as benzene, toluene, xylene, cresol, chlorobenzene, styrene, etc.; chlorinated hydrocarbons such as methylene chloride, ethylene chloride, carbon tetrachloride, chloroform, ethylenechlorohydrin, dichlorobenzene, etc.; N,N-dimethylformaldehyde, hexane, etc.

At the time of kneading and dispersing the magnetic coating composition, various kinds of kneaders can be used, for example, a two roll mill, a three roll mill, a ball mill, a pebble mill, a trommel, a sand grinder, Szegvari, an attritor, a high-speed impeller dispersing machine, a high-speed stone mill, a high-speed shock mill, a disper, a kneader, a high-speed mixer, a homogenizer, a ultrasonic dispersing machine, etc.

In the technique of kneading and dispersing the coating composition and coating the coating composition, a magnetic layer composed of two or more layers may be simultaneously formed by a multilayer simultaneous coating method as described in T.C. Patton, *Fluidity of Coating Materials and Pigment Dispersion*, (1975).

The thickness of the magnetic layer formed is from about 0.1 to 12 µm, and desirably from 0.3 to 5.0 µm as dry thickness. When the magnetic layer is composed of two or more layers, the above "thickness" means the total thickness of the magnetic layer. Also, the dry thickness of the magnetic layer is determined by the use, form, standard, etc.

The magnetic layer coated on the support by the foregoing process is dried, after, if necessary, being subjected to a treatment of orienting the ferromagnetic powder in the layer. Also, if necessary, a surface smoothening treatment is applied to the magnetic layer and the magnetic recording medium is cut in a desired form to provide the magnetic recording medium of this invention.

The invention is explained more practically by the following examples. However, it can be easily understood that the components, compounding ratios, the orders of steps, etc., shown therein can be changed within the scope of the present invention. Thus, the invention shall not be limited to these examples. In addition, all "parts" in these examples, unless otherwise indicated, are by weight.

EXAMPLE 1

| | |
|---|---|
| Ferromagnetic Fine Powder (Co-substitutes barium ferrite, specific surface area: 35 m$^2$/g, mean particle size: 0.06 µm, aspect ratio: 5) | 100 parts |
| Polar Group-Containing Vinyl Chloride Copolymer (—SO$_3$Na group: 8 × 10$^{-5}$ eq/g, number average molecular weight: 75,000) | 9 parts |
| Fine Particle Abrasive (Cr$_2$O$_3$, mean particle size: 0.3 µm) | 7 parts |
| Toluene | 30 parts |
| Methyl Ethyl Ketone | 30 parts |

After kneading the above-described components by a kneader for about one hour, the following components were added to the kneaded mixture and the resultant mixture was dispersed by a kneader for about 2 hours.

| | |
|---|---|
| Polar Group-Containing Polyester Polyurethane Resin (—SO$_3$Na group: 1 × 10$^{-4}$ eq/g, weight average molecular weight: 35,000) | 5 parts |
| Toluene | 200 parts |
| Methyl Ethyl Ketone | 200 parts |

The following carbon black and a coarse particle abrasive were added thereto, and the mixture was subjected to a dispersion treatment by a sand grinder at 2,000 r.p.m. for about 2 hours.

| | |
|---|---|
| Carbon Black (Ketchen black EC, trade name, made by Lion Akzo Co., mean particle size: 20 to 30 n.m.) | 5 parts |
| Coarse Particle Abrasive (Al$_2$O$_3$, AKP 12, trade name, made by Sumitomo Chemical Company, Limited, mean particle size: 0.50 µm) | 2 parts |

Furthermore, the following components were added thereto and the resultant mixture was dispersed again by a sand grinder to provide a magnetic coating composition.

| | |
|---|---|
| Polyisocyanate (Colonate L, trade name, made by Nippon Polyurethane K.K.) | 6 parts |
| Tridecyl stearate | 6 parts |

The magnetic coating composition thus obtained was coated on both surfaces of a polyethylene terephthalate film of 75 µm in a dry thickness of 2.5 µm each using a gravure roll. The coated film was subjected to a calender treatment to provide a magnetic recording medium.

Thereafter, the magnetic recording medium was punched to provide a 3.5 inch disk, the disk was placed in a cartridge having liner formed on the inside walls thereof, and necessary parts were furnished thereto to provide a 3.5 inch floppy disk.

EXAMPLE 2

By following the same procedure as Example 1, except that a —COOH group-containing vinyl chloride-vinyl acetate copolymer (400×110A, trade name, made by Nippon Zeon K.K., —COOH: 58×10$^{-5}$ eq/g) was used in place of the polar group-containing vinyl chloride copolymer, a 3.5 inch floppy disk was obtained.

EXAMPLE 3

By following the same procedure as Example 1, except that a —COOH group-containing polyester polyurethane resin (TIM 3005, trade name, made by Sanyo Chemical Industries, Ltd., —COOH: 3×10$^{-5}$ eq/g) was used in place of the polar group-containing polyester polyurethane resin, a 3.5 inch floppy disk was obtained.

EXAMPLE 4

By following the same procedure as Example 1, except that Co-substituted barium ferrite having a specific surface area of 30 m$^2$/g, a mean particle size of 0.05 µm, and an aspect ratio of 3 was used in place of the Co-substituted barium ferrite, a 3.5 inch floppy disk was obtained.

Comparative Example 1

By following the same procedure as Example 1, except that a vinyl chloride-vinyl acetate copolymer containing no polar group (MPR-TA, trade name, made by Nisshin Kagaku K.K.) was used in place of the polar group-containing vinyl chloride copolymer in Example 1 and further a polyester polyurethane resin having no polar group (N-2301, trade name, made by Nippon Polyurethane K.K.) was used in place of the polar group-containing polyester polyurethane resin in Example 1, a 3.5 inch floppy disk was obtained.

Comparative Example 2

By following the same procedure as Example 1, except that 15 parts of the polar group-containing vinyl chloride copolymer was used in place of 9 parts of the resin, 9 parts of the polar group-containing polyester polyurethane resin was used in place of 5 parts of the resin, and 9 parts of polyisocyanate was used in place of 6 parts of polyisocyanate, a 3.5 inch floppy disk was obtained.

Comparative Example 3

The coarse particle abrasive as used in Example 1 was kneaded and dispersed with the ferromagnetic powder, the polar group-containing vinyl chloride copolymer, and the fine particle abrasive as used in Example 1. In this case, 33 parts of toluene and 33 parts of methyl ethyl ketone were used for kneading and dispersing the above-described components. Also, the polar group-containing polyester polyurethane resin was dispersed in the dispersion as in Example 1 but in this case, parts of toluene and 197 parts of methyl ethyl ketone were used for dispersing the polar group-containing polyester polyurethane resin. Thus, a 3.5 inch floppy disk was obtained.

Comparative Example 4

| | |
|---|---|
| Ferromagnetic Fine Powder (Co-substitutes barium ferrite, specific surface area: 35 m²/g, mean particle size: 0.06 μm, aspect ratio: 5) | 100 parts |
| Polar Group-Containing Vinyl Chloride Resin (—$SO_3Na$ group: $8 \times 10^{-5}$ eq/g, number average molecular weight: 75,000) | 9 parts |
| Toluene | 28 parts |
| Methyl Ethyl Ketone | 28 parts |

After kneading the above-described components by a kneader for about one hour, the following components were added to the kneaded mixture and the resultant mixture was dispersed by a kneader for about 2 hours.

| | |
|---|---|
| Polar Group-Containing Polyester Polyurethane Resin (—$SO_3Na$ group: $1 \times 10^{-4}$ eq/g, weight average molecular weight: 35,000) | 5 parts |
| Toluene | 202 parts |
| Methyl Ethyl Ketone | 202 parts |

The following carbon black, a fine particle abrasive and a coarse particle abrasive were added thereto, and the mixture was subjected to a dispersion treatment by a sand grinder at 2,000 r.p.m. for about 2 hours.

| | |
|---|---|
| Carbon Black (Ketchen black EC, trade name, made by Lion Akzo Co., mean particle size: 20 to 30 n.m.) | 5 parts |
| Fine Particle Abrasive ($Cr_2O_3$, mean particle size: 0.3 μm) | 7 parts |
| Coarse Particle Abrasive ($Al_2O_3$, AKP 12, trade name, made by Sumitomo Chemical Company, Limited, mean particle size: 0.50 μm) | 2 parts |

Furthermore, the following components were added thereto and the resultant mixture was dispersed again by a sand grinder to provide a magnetic coating composition.

| | |
|---|---|
| Polyisocyanate (Colonate L, trade name, made by Nippon Polyurethane K.K.) | 6 parts |
| Tridecyl stearate | 6 parts |

The magnetic coating composition thus obtained was coated on both surfaces of a polyethylene terephthalate film of 75 μm in a dry thickness of 2.5 μm each using a gravure roll. The coated film was subjected to a calender treatment to provide a magnetic recording medium.

Thereafter, the magnetic recording medium was punched to provide a 3.5 inch disk, the disk was placed in a cartridge having liner formed on the inside walls thereof, and necessary parts were furnished thereto to provide a 3.5 inch floppy disk.

Comparative Example 5

By following the same procedure as Example 1, except that the coarse particle abrasive $Al_2O_3$ (AKP 12) was omitted, a 3.5 inch floppy disk was obtained.

Comparative Example 6

By following the same procedure as Example 1, except that the fine particle abrasive $Cr_2O_3$ was omitted and toluene and methyl ethyl ketone were used as in Comparison Example 4, a 3.5 inch floppy disk was obtained.

Comparative Example 7

By following the same procedure as Comparison Example 6, except that 7 parts of the coarse particle abrasive was used in place of 2 parts of the same abrasive, a 3.5 inch floppy disk was obtained.

Comparative Example 8

By following the same procedure as Example 1, except that a coarse particle abrasive $Al_2O_3$ (WA 3000, mean particle size of 3.9 μm, trade name, made by Fujima Kenmazai K.K.) was used in place of the coarse particle abrasive $Al_2O_3$ (AKP 12) in Example 1, a 3.5 inch floppy disk was obtained.

Comparative Example 9

The same procedure as Example 1 was followed, except that a vinyl chloride-vinyl acetate copolymer having no polar group (MPR-TA, trade name, made by Nisshin Kagaku K.K.) was used in place of the polar group-containing vinyl chloride copolymer in Example 1, a polyester polyurethane resin having no polar group (N-2301, trade name, made by Nippon Polyurethane K. K.) was used in place of the polar group-containing polyester polyurethane resin in Example 1, and 7 parts of the coarse particle abrasive was used in place of 2 parts of the same abrasive in Example 1. The coarse particle abrasive was kneaded and dispersed together with the ferromagnetic powder, the foregoing vinyl chloride-vinyl acetate copolymer, and the fine particle abrasive using 33 parts of toluene and 33 parts of methyl ethyl ketone. In addition, 197 parts of toluene and 197 parts of methyl ethyl ketone were used at dispersing the foregoing polyester polyurethane resin. Thus, a 3.5 inch floppy disk was obtained.

Comparative Example 10

The same procedure as Example 1 was followed, except that 12 parts of a vinyl chloride-vinyl acetate copolymer having no polar group (MPR-TA, trade name, made by Nisshin Kagaku K. K.) were used in place of the polar group-containing vinyl chloride copolymer in Example 1, 9 parts of a polyester polyurethane resin (N-2301, trade name, made by Nippon Polyurethane K. K.) was used in place of the polar group-containing polyester polyurethane resin in Example 1. The coarse particle abrasive in Example 1 was kneaded and dispersed together with the ferromagnetic powder, the foregoing vinyl chloride-vinyl acetate copolymer, and the fine particle abrasive using 33 parts of toluene and 33 parts of methyl ethyl ketone. In addition, 197 parts of toluene and 197 parts of methyl ethyl ketone were used at dispersing the polyester polyurethane resin. Thus, a 3.5 inch floppy disk was obtained.

Comparative Example 11

The same procedure as Example 1 was followed, except that 12 parts of a vinyl chloride-vinyl acetate copolymer having no polar group (MPR-TA, trade name, made by Nisshin Kagaku K. K.) were used in place of the polar group-containing vinyl chloride copolymer, 9 parts of a polyester polyurethane resin having no polar group (N-2301, trade name, made by Nippon Polyurethane K. K.) were used in place of the polar group-containing polyester polyurethane resin in Example 1, 9 parts of polyisocyanate were used in place of 6 parts thereof, 7 parts of the coarse particle abrasive were used in place of 2 parts of the coarse particle abrasive in Example 1. The coarse particle abrasive was kneaded and dispersed together with the ferromagnetic powder, the foregoing vinyl chloride-vinyl acetate copolymer, and the fine particle abrasive using 33 parts of toluene and 33 parts of methyl ethyl ketone. In addition, 197 parts of toluene and 197 parts of methyl ethyl ketone were used at dispersing the foregoing polyester polyurethane resin. Thus, a 3.5 inch floppy disk was obtained.

Each of the floppy disk samples thus obtained was driven using a 3.5 inch floppy disk drive PD 211 (trade name, made by Toshiba Corporation) and a 24 hour thermocycle test with the following flow as one cycle was practiced by placing the head on truck 12.

The running durability of each sample was evaluated by the running state in the case of running the sample at the pass number of 20,000,000 times under the thermocycle condition.

[Thermocycle Flow]

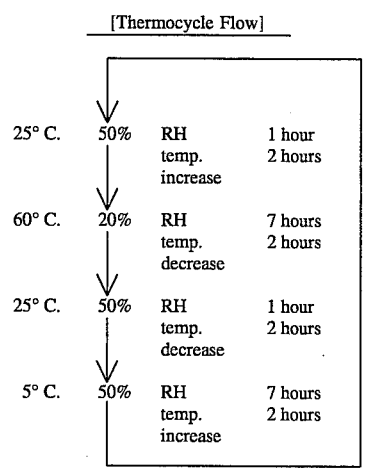

The initial 2F output of each sample was determined as a relative value with that of the sample of Example 1 as 100 (used drive, PD211, trade name, made by Toshiba Corporation).

In addition, the friction coefficient between each magnetic layer and a magnetic head was determined by the following formula.

Friction coefficient=$[(A-B) \times$torque no.$]/[$radius (3.975 cm)$\times$head pressure$\times 2]$ A: the value of the electric current of a motor when disposing each magnetic disk in the drive PD-211 (made by Toshiba Corporation) so that the surface of the magnetic disk was in contact with the magnetic head.

B: the value of the electric current when racing the drive PD-211.

The torque fluctuation, that is, the fluctuation of the friction coefficient was also recorded.

The results thus obtained are shown in Table 1:

TABLE 1

| | Running Durability (× 10,000 pass) | Initial 2F Output | Friction Coefficient |
|---|---|---|---|
| Example 1 | 2000 No trouble | 100% | 0.18 |
| Example 2 | 2000 No trouble | 98% | 0.17 |
| Example 3 | 2000 No trouble | 97% | 0.18 |
| Example 4 | 2000 No trouble | 96% | 0.18 |
| Comparison Example 1 | 1850 Drop out occurred. | 85% | 0.19 |
| Comparison Example 2 | 900 Drop out occurred. | 70% | 0.35 fluctuated |
| Comparison Example 3 | 1500 Drop out occurred. | 101% | 0.25 |
| Comparison Example 4 | 2000 No trouble | 83% | 0.22 fluctuated |
| Comparison Example 5 | 1200 Drop out occurred. | 102% | 0.28 fluctuated |
| Comparison Example 6 | 850 Drop out occurred. | 110% | 0.32 |
| Comparison Example 7 | 1850 Drop out occurred. | 89% | 0.18 |
| Comparison Example 8 | 2000 No trouble | 77% fluctuated | 0.16 |
| Comparison Example 9 | 1800 Drop out occurred. | 70% | 0.23 |
| Comparison Example 10 | 1100 Drop out occurred. | 71% | 0.30 fluctuated |
| Comparison Example 11 | 950 Drop out occurred. | 69% | 0.28 fluctuated |

As is clear from the above results, the samples of Examples 1 to 3 show stable results in the running durability, output (2F), and friction coefficient.

On the other hand, in the system of using the binder resin having no polar group in Comparative Example 1, running durability and output are both inferior. The inferior results are caused by the inferior dispersion and the surface of the magnetic layer in Comparative Example 1 is rough compared with that in Example 1.

Comparative Example 2 is a system of increasing the amount of the binder resin, in which the output is greatly reduced with a lowering of the packing density, and the friction coefficient is increased and fluctuated with the increase of the binder resin, which results in greatly reducing the running durability.

In Comparative Example 3, the coarse particle abrasive is dispersed together with the fine particle abrasive, whereby the effect of the coarse particle abrasion is not sufficiently obtained.

Comparative Example 4 is a system of dispersing the fine particle abrasion and the coarse particle abrasion together, in which the output is reduced and the fluctuation of the friction coefficient occurs. The reason is assumed to be as follows. That is, the fine particle abrasive more largely exists near the surface of the magnetic layer to cause the reduction of the packing density of the ferromagnetic powder in the surface layer of the magnetic layer and the reduction of output, and also since the $Cr_2O_3$ abrasive exists in the surface layer, fluctuation of the friction coefficient occurs.

In Comparative Example 5, the effect of the coarse particle abrasive is not obtained as in Comparative Example 3.

Comparative Example 6 is a system in which the fine particle abrasive is omitted, in which the friction coefficient is increased, which results in deterioration of the running durability.

Comparative Example 7 is a system of balancing the output and the running durability with the coarse particle abrasive in place of the fine particle abrasive and the friction coefficient is low, but the output and the running durability are inferior as compared with the samples of this invention.

Comparative Example 8 is a system of increasing the mean particle size of the coarse particle abrasive, in which the running durability and the friction coefficient are stable but the output is greatly reduced and a fine fluctuation of output occurs.

Comparative Example 9 is a system using a conventional resin as the binder resin, increasing the amount of the coarse particle abrasive, and dispersing the coarse particle abrasive together with the fine particle abrasive and the ferromagnetic powder. Comparative Example 10 is a system using a conventional resin as the binder resin, increasing the amount of the resin, and dispersing the coarse particle abrasive together with the fine particle abrasive and the ferromagnetic powder. In both systems, running durability, initial 2F output, and friction coefficient are inferior as compared with the samples of this invention.

Comparative Example 11 is a system of further increasing the amounts of the hardening agent and the coarse particle abrasive in Comparative Example 10, but it can be seen that the magnetic recording medium is not improved.

Comparative Example 12

| Ferromagnetic Fine Powder (acicular Co-γ-iron oxide, specific surface area 22 m²/g, mean length of acicular particles: 0.35 μm, acicular ratio: 8) | 100 parts |
|---|---|
| Polar Group-Containing Vinyl Chloride Copolymer (—SO$_3$Na: 8 × 10$^{-5}$ eq/g, number average molecular weight: 75,000) | 16 parts |
| Fine Particle Abrasive (Cr$_2$O$_3$, mean particle size: 0.3 μm) | 7 parts |
| Toluene | 35 parts |
| Methyl Ethyl Ketone | 35 parts |

After kneading the above-described components for about one hour, the following components were further added thereto and the resultant mixture was dispersed by means of a kneader for about 2 hours.

| Polar Group-Containing Polyester Polyurethane Resin (—SO$_3$Na: 1 × 10$^{-4}$ eq/g, weight average molecular weight: 35,000) | 9 parts |
|---|---|
| Toluene | 250 parts |
| Methyl Ethyl Ketone | 250 parts |

The following carbon black and the coarse particle abrasive were added to the dispersion obtained and the resultant mixture was dispersed for about 2 hours by a sand grinder at 2,000 r.p.m.

| Carbon Black (Ketchen Black EC, trade name, made by Lion Akzo K.K., mean particle size: 20 to 30 n.m.) | 9 parts |
|---|---|
| Coarse Particle Abrasive (Al$_2$O$_3$, AKP 12, trade name, made by Sumitomo Chemical Corporation, mean particle size: 0.50 μm) | 2 parts |

Furthermore, the following components were added to the dispersion followed by a second dispersion to provide a magnetic coating composition.

| Polyisocyanate (Colonate L, trade of name, made by Nippon Polyurethane K.K.) | 11 parts |
|---|---|
| Tridecyl Stearate | 8 parts |

The magnetic coating composition thus obtained was coated on both surfaces of a polyethylene terephthalate film of 75 μm in a dry thickness of 2.5 μm each using a gravure roll and then subjected to a calender treatment to provide a magnetic recording medium.

Thereafter, the magnetic recording medium was punched to provide a 3.5 inch disk, the disk was placed in a 3.5 inch cartridge having a liner on the inside walls thereof, and necessary parts were equipped thereto to provide a 3.5 inch floppy disk.

A 2F signal of 35 KBpi was written on the floppy disk by a drive PD-211 and the reproducing output was compared with that in Example 1.

|  | Initial 2F Output |
|---|---|
| Example 1 | 100% |
| Comparative Example 12 | 50% |

From the above results, it can be seen that the hexagonal ferrite magnetic substance for use in this invention is suitable for high-frequency recording.

As described above, in the present invention, by specifying the particle size ranges of the coarse particle abrasive and the fine particle abrasive, after dispersing the fine particle abrasive with the hexagonal ferrite fine powder and the binder resin, dispersing the coarse particle abrasive with that dispersion to provide a magnetic coating composition, and coating the magnetic coating composition on a nonmagnetic support, the density of the coarse particle abrasive distributed in the vicinity of the surface of the magnetic layer is higher than that of the coarse particle abrasive distributed in the other region of the magnetic layer to form the magnetic layer having the specific structure capable of reducing the coefficient of friction and also to keep a high packed density of the hexagonal ferrite fine powder. By this method, a magnetic recording medium capable of stably keeping a high output and having an excellent running durability can be economically provided.

While the invention has been described in detail and with reference to specific embodiments thereof, it will be apparent to one skilled in the art that various changes and modifications can be made therein without departing from the spirit and scope thereof.

What is claimed is:
1. A magnetic recording medium comprising a nonmagnetic support having thereon a magnetic layer comprising a ferromagnetic powder and a binder resin as the main components together with abrasive particles, wherein the ferromagnetic powder is a hexagonal ferrite fine powder having particles sizes of from 0.01 to 0.2 μm and a coercive force of from 600 to 2,000 Oe, the binder resin is composed of at least one of a polyurethane resin and a vinyl chloride resin each having at least one kind of a polar group, and the content of the binder resin is from 10 to 25 parts by weight per 100 parts by weight of the ferromagnetic powder, the abrasive particles are composed of a fine particle abrasive having a mean particle size of from 0.1 to 0.39 µm and a coarse particle abrasive having a mean particle size of from 0.4 to 1.0 µm, and the density of the coarse particle abrasive distributed in the region from the upper surface to t/3 of the magnetic layer, wherein t represents a thickness of the magnetic layer, is at least twice that of the coarse particle abrasive distributed in the remainder of the magnetic layer.

2. The magnetic recording medium of claim 1, wherein the abrasive particles are alumina.

3. The magnetic recording medium of claim 1, for recording a digital signal of at least 17.5 KBpi.

4. The magnetic recording medium of claim 2, for recording a digital signal of at least 17.5 KBpi.

* * * * *